United States Patent Office 3,583,876
Patented June 8, 1971

3,583,876
COATING COMPOSITION
Johan Jakob Wennergren, Ornskoldsvik, Sweden, assignor to Mo Och Domsjo Aktiebolag, Ornskoldsvik, Sweden
No Drawing. Continuation-in-part of application Ser. No. 775,587, Nov. 12, 1968, which is a continuation of application Ser. No. 536,620, Mar. 23, 1966, both now abandoned. This application Jan. 2, 1970, Ser. No. 397
Int. Cl. C08b 27/42
U.S. Cl. 106—189    11 Claims

ABSTRACT OF THE DISCLOSURE

A paper coating composition is provided having improved water-retaining properties, and a lesser tendency to be absorbed in the paper, comprising a paper pigment filler dispersed in an aqueous solution of a water-soluble cellulose ether having a viscosity of less than 400 cps. in a 2% aqueous solution at 20° C., and a water-soluble salt of a chlorophenol. A coated paper product is also provided.

---

This application is a continuation-in-part of U.S. application Ser. No. 775,587 filed Nov. 12, 1968, which in turn was a continuation of U.S. application Ser. No. 536,620 filed Mar. 23, 1966 both now abandoned.

The present invention relates to the preparation of paper coating compositions which possess improved water-retaining properties, whereby penetration of water from the coating compositions into the base paper on coating the same, is reduced. The term "coating" is used to indicate coating the surface of paper with an aqueous solution of a binding agent composition with an additive or a filler.

When using conventional coating compositions containing alginate, starch, casein, protein, etc., the base paper absorbs the composition to a considerable extent, and becomes so wet that the strength of many paper grades is reduced, and the risk is great of the paper sheet tearing during its various stages of treatment.

It had been believed that the best way to reduce the absorption of water by the paper base was to increase the viscosity of the coating solution to an extremely high value, e.g. viscosities of 100,000 cps., or more, as measured on a Brookfield viscometer at 20° C. The use of viscous coating compositions including a water-soluble, gellable cellulose derivative binder is disclosed in U.S. Patent No. 2,727,837 issued on Dec. 20, 1955 to Gregory.

The absorption of water by the base paper can occur by two mechanisms: first, the absorption of water through the interstitial pores in the surface of the paper, so that the water seeps into the interior pores which lie below the surface of the paper; second, the absorption of water through the individual fibers by wicking, and transfer of water between fibers in contact with each other by wicking.

Compositions which include both a water-soluble nonionic cellulose ether and a water-soluble salt of a chlorophenol have previously been utilized for forming a mortar composition. Such a composition is disclosed in U.S. Pat. No. 3,215,549, issued Nov. 2, 1965 to Ericson. The compositions of Ericson, however, as do all mortar compositions, have extremely high viscosities and utilize nonionic water-soluble cellulose ethers which have a high viscosity. Such viscosity, as explained below, is measured under standardized conditions in a 2% aqueous solution.

The problems found in the use of a mortar composition for the joining of such building elements as tiles or bricks, are quite different from those found in the coating of paper. The porosity of the tiles or bricks is far greater, i.e. both the size of the pores and the percent volume of pores per unit surface area is greater, and there is no wicking into a brick or tile material as there is into paper fibers. Further, there is no problem of loss of strength of the brick or tile due to water absorption. The tile or brick, of course, is structurally not affected by the absorption of water, so that water absorption is significant only in ensuring the proper setting of the mortar paste, but does not affect the properties of the base onto which it is applied. Ericson, accordingly, states that he requires at least a medium viscosity cellulose ether, i.e. one having a viscosity of at least 500 cps. in a 2% aqueous solution as measured in a Brookfield viscometer at 20° C., and preferably from 700 to 12,000 cps. Such high viscosity is necessary in order to obtain the desired effectiveness for Ericson's mortar compositions, and to obtain the desired high viscosity for the final mortar composition products.

According to the present invention, improved coating compositions for paper are produced having a decreased water absorptivity into the paper substrate to which it is applied without an excessively high viscosity, comprising a paper pigment filler, a water-soluble low viscosity nonionic cellulose ether having a viscosity below 400 cps. in a 2% aqueous solution measured in a Brookfield viscometer at 20° C., as a binding agent, and a water-soluble chlorophenol salt. The use of a low viscosity ether binder facilitates the mixing of the coating composition and the spreading of the material evenly over the paper to be coated, and the fact that a low viscosity composition can be used without appreciable absorption into the paper is very advantageous.

The coating compositions prepared according to the invention surprisingly possess greatly improved water-retaining properties even though the viscosity, both of the cellulose ether and of the composition, may be low. It has not previously been known that low viscosity cellulose ether can be thus improved in the presence of the water-soluble chlorophenol salts. In comparison with known coating compositions, the advantages of a low viscosity are obtained, together with a decrease in penetration by water from the aqueous coating composition into the base paper, thus reducing the loss of mechanical strength of the base paper during coating. Thus, the base paper need not be prepared to have as great a strength prior to coating in order to have the desired final strength subsequent to coating. Reducing water absorption also eliminates, or at least reduces, the need to use sizing in the base paper; the addition of sizing had previously been considered necessary for the preparation of a base paper prior to coating.

The present invention permits the use of the low viscosity nonionic water-soluble cellulose ethers, i.e. cellulose ethers which are characterized by a viscosity in a 2% aqueous solution within the range of from about 8 to about 400 cps., measured in a Brookfield viscometer at 20° C.

The water-soluble or water-insoluble ionic cellulose ethers, including salts of carboxymethyl cellulose, are generally not useful for the present invention. Water absorption is not reduced by the addition to the ionic ethers of the water-soluble chlorophenol salts.

Gregory, supra, discloses paper coating compositions containing certain "gellable" water-soluble cellulose derivatives, including the ionic ethers, such as sodium carboxymethyl cellulose, as well as certain nonionic cellulose ethers, such as hydroxyethyl cellulose, together with a setting agent to induce coagulation of the cellulose derivative in situ on the paper after some of the water has been removed. There is no discussion by Gregory of how to improve water retention by the composition *before* coagulation. Indeed, when the cellulose derivative in the coating composition of Gregory is coagulated, i.e. precipitated, the cellulose derivative and setting agent may be removed from the composition together, after which the water present can be absorbed into the paper. Gregory avoids this problem by evaporating water first (see column 2, lines 33 to 40), by drying. There is, however, no agent present to reduce water absorption prior to drying.

It has been surprisingly discovered that the adherence between the composition and the base paper is not reduced despite the reduced penetration of water, and that in fact in a number of cases it has improved.

Furthermore, the reduced penetration effect gives a better coverage than when using corresponding amounts of conventional coating compositions, and the applied film, in many cases, is smoother than with said conventional compositions.

When coating both sides of the base paper at the same time, the risk of blister formation on the outer layer during the subsequent heat treatment of the paper is minimized, due to the reduced amount of water enclosed therein.

The low viscosity water-soluble cellulose derivatives which can be used as binding agents according to the invention are low viscosity water-soluble cellulose ethers such as methylcellulose, ethylcellulose, hydroxyethylcellulose, hydroxymethylcellulose, hydroxypropylcellulose, methyl-hydroxyethylcellulose, ethyl-hydroxyethylcellulose, methyl-hydroxypropylcellulose, etc. The viscosity of the cellulose derivative used is selected according to the solids content and consistency desired in the coating composition.

If so desired, the low viscosity water-soluble cellulose derivative can also be used together with dispersions of one or more plastic binding agents, such as homopolymers or copolymers of acrylic acid esters, acrylonitrile, vinyl acetate, styrene-butadiene plastics, etc., for achieving specific purposes, e.g. to improve oil-resistance, water-resistance, etc. When plastic binding agents are used, they influence the viscosity of the coating compositions, and thus particular attention must be paid to this when meeting the viscosity requirements for the mixture.

In particular, when it is desirable to reduce the viscosity of the composition used, it is suitable to replace a portion, preferably from 5 to 75%, of the cellulose derivative by such a plastic dispersion, which is compatible with the cellulose derivative and the pigment, e.g. a 40% to 55% aqueous dispersion of a copolymer based on acrylic acid esters, such as Acronal 500 D, an aqueous dispersion of a styrene butadiene copolymer, such as Dow Latex 636, Butakon, etc.

Suitable fillers for use in coating compositions according to the invention are china clay, chalk, titanium dioxide, talc, barium sulphate, satin white, zinc sulphide, zinc oxide, etc.

The water-soluble chlorophenol salts which can be used in compositions according to the invention are water-soluble salts of tri-, tetra- or pentachlorophenol, such as sodium trichlorophenolate, sodium tetrachlorophenolate and sodium pentachlorophenolate.

Water is the most suitable solvent for compositions according to the invention but additives hereto of smaller amounts of other substances such as alcohols and/or polyalcohols, e.g. aliphatic alcohols, glycols, glycerol, sugar alcohols, and polyalkylene glycols can be added to give the compositions certain particularly desirable properties. For example, octanol or other substances can be added, to reduce foaming. Surface-active substances can be added to the compositions according to the invention to impart an improved consistency, e.g. an increased flow, and to cause the various components in the compositions to mix together more easily. It has surprisingly been discovered that addition of a surface-active substance to the compositions according to the invention does not diminish to any great extent the water-retaining properties. Suitable surface-active substances are particularly nonionic substances such as an oleyl amine/ethylene oxide adduct comprising 7 mols of ethylene oxide (Berol EMU28). Suitable amounts of surface-active substances are from 0.1 to 2%, based on the weight of the filler.

The coating compositions according to the invention have a solids content of from about 10 to 70%, preferably from about 20 to 60%. Solids content of from about 25 to about 45% are particularly suitable in coating compositions according to the invention. Suitable amounts of low viscosity cellulose derivative in these compositions, when the cellulose derivative is used as the sole binding agent, are in the order of from about 1 to 15%, preferably from about 5 to 10%, based on the weight of the filler. When the cellulose derivative is used together with other binding agents, the addition of cellulose derivative can be reduced, and suitably constitutes from about 1 to about 12%, based on the weight of the filler. Suitable amounts of water-soluble salt of chlorophenol in coating compositions according to the invention are from about 2 to 40%, preferably from about 2 to 15%, based on the weight of cellulose derivative.

The coating compositions prepared in accordance with this invention should have a viscosity below 70,000 cps. at 20° C., measured in a Brookfield viscometer, to be capable of being applied, and it is preferred that the viscosity be within the range of from about 3,000 to about 10,000 cps.

The coating compositions can be either sprayed on the paper or applied by means of common coating apparatus, such as a calendering machine having water doctors, glue presses of various constructions, Massey coaters, etc., blade coating machines such as trailing blade coaters, etc., and roller coating machines of various types, provided with air brushes or other means of obtaining uniform distribution.

Examples 1 to 6 below show several suitable compositions according to the invention.

EXAMPLE 1

| | Parts by weight |
|---|---|
| China clay SPS | 100 |
| Na hexametaphosphate | 0.4 |
| Water | 200 |
| Ethyl-hydroxyethylcellulose, viscosity 250–400 cps. in 2% aqueous solution at 20° C. | 8 |
| Na trichlorophenolate | 2.6 |
| Viscosity (20° C., Brookfield), cps. | 50,000 |

EXAMPLE 2

| | |
|---|---|
| Calcium carbonate | 25 |
| China clay SPS | 75 |
| Na hexametaphosphate | 0.4 |
| Water | 65 |
| Hydroxyethylcellulose, viscosity 10–20 cps. in 2% cps. aqueous solution at 20° C. | 8 |
| Octanol | 8 |
| Na pentachlorophenolate | 0.8 |
| Viscosity (20° C., Brookfield), cps. | 50,000 |

EXAMPLE 3

| | |
|---|---|
| Titanium dioxide | 10 |
| China clay SPS | 90 |
| Na hexametaphosphate | 0.4 |
| Water | 150 |
| Ethyl-hydroxyethylcellulose, viscosity 50–100 cps. in 2% aqueous solution at 20° C. | 8 |
| Na pentachlorophenolate | 0.4 |
| Viscosity (20° C., Brookfield), cps. | 48,400 |

EXAMPLE 4

| | Parts by weight |
|---|---|
| China clay SPS | 100 |
| Na hexametaphosphate | 0.4 |
| Water | 150 |
| Methyl-hydroxyethylcellulose, viscosity 50–100 cps. in 2% aqueous solution at 20° C. | 4 |
| Na tetrachlorophenolate | 6 |
| Acronal 500 D (acrylic resin, 50% dispersion, BASF) | 24 |
| Viscosity (20° C., Brookfield), cps. | 5,300 |

EXAMPLE 5

A coating composition was prepared in the following way:

Step 1.—9 parts of Modocoll E 20 (ethyl-hydroxyethylcellulose, Brookfield viscosity, 2% solution, 20° C., 50–100 cp.) was wetted with 71 parts of water at approximately 80° C. Thereafter 70 parts of water at approximately 15° C. was added. Subsequent to agitation, the solution was allowed to stand and swell for approximately 30 minutes.

Step 2.—150 parts of a pulverized coating clay (China clay SPS) was dispersed using a propeller agitator in 100 parts of water, in which 0.6 part of sodium hexametaphosphate had previously been dissolved, constituting the dispersing agent for the clay.

Step 3.—The binding agent solution according to Step 1 was added to the pigment dispersion according to Step 2 whilst subjected to agitation in a propeller mixer.

Step 4.—0.45 part of sodium pentachlorophenolate dissolved in 4.5 parts of water was added to the coating slurry according to Step 3 whilst being subjected to agitation in the propeller mixer.

Step 5.—1.25 parts of wetting agent Berol EMU28 dissolved in 11.25 parts of water at 80° C. were added to the coating slurry according to Step 4 whilst subjected to agitation in the propeller mixer. The final coating composition had the following composition:

| | Parts by weight |
|---|---|
| Water | 100 |
| China clay SPS | 150 |
| Sodium hexametaphosphate | 0.6 |
| 6% aqueous solution of ethylhydroxyethylcellulose (viscosity 50–100 cp. in 2% aqueous solution at 20° C.) | 150 |
| Sodium pentachlorophenolate | 0.45 |
| 10% aqueous solution of wetting agent (Berol EMU28) | 12.5 |

It had a viscosity (20° C., Brookfield), of 9300 cps.

The composition was used to coat a non-sized and non-calendered journal paper. The composition was applied to both sides using a "trailing blade coater." Test data for the uncoated paper can be seen in Table 1, and test data for the coated paper before and after it had been calendered can be seen in Table 2.

TABLE 1

| | |
|---|---|
| Basis weight g./m.$^2$ | 52.6 |
| Bulk, cm.$^3$/g. | 2.21 |
| Surface roughness (75 mm. water column) according to Bendtsen, ml./min.: | |
| Wire side | 333 |
| Top side | 233 |
| Mean value | 283 |
| Porosity according to Bendtsen, ml./min. | 714 |
| Brightness, percent: | |
| Wire side | 64.8 |
| Top side | 64.8 |
| Mean value | 64.8 |
| Luminance, percent | 71.6 |
| Opacity, percent | 93.9 |
| Spread coefficient | 589 |
| Pure color, percent | 6.1 |
| Dom. wavelength, nm. (Zeiss Elrepho) | 571.1 |
| Ash content, percent | 8.1 |

TABLE 2

| | Before calendering | After calendering |
|---|---|---|
| Basis weight, g./m.$^2$ | 63.1 | 63.0 |
| Bulk, cm.$^3$/g. | 1.24 | 1.19 |
| Surface roughness (Bendtsen), ml./min.: | | |
| Wire side | 79 | 57 |
| Top side | 49 | 27 |
| Mean value | 64 | 42 |
| Hardness (Bendtsen), percent: | | |
| Wire side | 35.4 | 31.6 |
| Top side | 32.7 | 33.3 |
| Mean value | 34.1 | 32.5 |
| Porosity (Bendtsen), ml./min | 51 | 43 |
| Brightness, percent: | | |
| Wire side | 69.8 | 69.3 |
| Top side | 70.1 | 70.0 |
| Mean value | 70.1 | 69.7 |
| Luminance, percent | 76.1 | 75.3 |
| Opacity, percent | 96.8 | 96.3 |
| Spread coefficient | 764 | 718 |
| Pure color, percent | 4.7 | 4.8 |
| Dom. wavelength (Zeiss Elrepho), nm. | 570.5 | 570.0 |
| Ash content, percent | 21 | 21 |
| Gloss, percent: | | |
| Wire side | 36 | 38 |
| Top side | 36 | 46 |
| Mean value | 36 | 42 |

The coated finished paper was test printed and the following type in black contrast was obtained:

Before calendering:
| | |
|---|---|
| Wire side | 0.019 |
| Top side | 0.020 |

After calendering:
| | |
|---|---|
| Wire side | 0.025 |
| Top side | 0.023 |

EXAMPLE 6

A coating composition was prepared in the following way: 4.5 parts of ethyl-hydroxyethylcellulose of the viscosity 50–100 cps. in 2% solution at 20° C., and 0.2 part of sodium pentachlorophenolate were moistened with 35 parts of water of 80° C., after which an additional amount of 35 parts of water of 15° C. was added. The mixture was stirred and left to swell for 30 minutes. 105 parts of powdered coating clay (China clay SPS) was then dispersed in 100 parts of water of 15° C. containing 0.6 part of sodium hexametaphosphate and the mixture was stirred with a propeller agitator until a homogeneous dispersion was obtained. To the clay dispersion 9 parts of a 50% aqueous dispersion of styrene-butadiene copolymer (Dow Latex 636) was added whilst stirring. The cellulose derivative solution was then added to the clay dispersion until a homogeneous dispersion was obtained. The resulting coating composition had a viscosity of about 5,000 cps. at 20° C. and showed excellent drying, coating and adhesive properties when applied on any unsized uncalendered journal paper.

Having regard to the foregoing disclosure, the following is claimed as the inventive and patentable embodiments thereof:

1. A paper coating composition having a total solids content from about 10 to about 70% by weight, having a viscosity of less than 70,000 cps. at 20° C. measured on a Brookfield viscometer, and consisting essentially of a paper pigment filler dispersed in an aqueous solution of a low viscosity, water-soluble, nonionic cellulose ether having a viscosity in a 2% aqueous solution within the range from about 8 to about 400 cps. measured in a Brookfield viscometer at 20° C., the ether being present in an amount within the range from about 1 to about 15% by weight of the filler, and a water-soluble salt of a chlorophenol in an amount within the range from about 2 to about 40% by weight of the cellulose ether to inhibit penetration of water from the composition into the paper being coated, and reduce the water absorption to a value well below that obtained at an equivalent cellulose ether concentration and an appreciably higher viscosity in the absence of the chlorophenol salt.

2. A composition according to claim 1, characterized in that the water-soluble chlorophenol salt is sodium trichlorophenolate, sodium tetrachlorophenolate or sodium pentachlorophenolate.

3. A paper coating composition according to claim 1 wherein the cellulose ether is a hydroxyethyl cellulose.

4. A paper coating composition according to claim 1 wherein the chlorophenol salt is an amount of from about 5 to about 15% by weight of the cellulose ether.

5. A paper coating composition according to claim 1 containing in addition at least one agent selected from the group consisting of nonionic surface active agents and octanol.

6. A paper coating composition according to claim 1 wherein a portion of the cellulose ether is replaced by a plastic binding agent selected from the group consisting of homopolymers and copolymers of acrylic acid esters, acrylonitrile, vinyl acetate and styrene-butadiene plastics.

7. A paper coating composition according to claim 1 containing in addition a member selected from the group consisting of alcohol and polyol solvents.

8. A composition in accordance with claim 7 in which the polyol is a polyalkylene glycol.

9. A paper coating composition in accordance with claim 1 having a viscosity of from about 3,000 to about 10,000 cps. at 20° C., measured in a Brookfield viscometer.

10. A coated paper product comprising a base paper sheet and, coated directly on at least one surface thereof, a coating consisting essentially of a paper pigment filler; a water-soluble nonionic cellulose ether binder in an amount of from about 1 to about 15% by weight of the filler, the ether being characterized by having a viscosity of from about 8 to about 400 cps. in a 2% aqueous solution measured in a Brookfield viscometer at 20° C., and a water-soluble salt of a chlorophenol in an amount of from about 2 to about 40% by weight of the cellulose ether.

11. A process for coating a base paper sheet using an aqueous mixture of a binding agent while limiting penetration of water from the coating composition into the base paper sheet, comprising applying to at least one surface of the base paper sheet a coating composition having a viscosity of less than 70,000 cps. at 20° C. measured in a Brookfield viscometer, and consisting essentially of a paper pigment filler dispersed in an aqueous solution of a low viscosity, water-soluble, nonionic cellulose ether having a viscosity in a 2% aqueous solution within the range from about 8 to about 400 cps. measured in a Brookfield viscometer at 20° C., the ether being present in an amount within the range from about 1 to about 15% by weight of the filler, and a water-soluble salt of a chlorophenol which is present in an amount within the range from about 2 to about 40% by weight of the cellulose ether, the amounts of cellulose ether and chlorophenol salt limiting penetration of water from the coating composition into the base paper sheet, and reducing water absorption to a value well below that obtained at an equivalent cellulose ether concentration and an appreciably higher viscosity in the absence of the chlorophenol, the total solids content of the composition being from about 10 to about 70% by weight, and drying the paper to form a surface coating directly on the surface of the base paper sheet.

References Cited

UNITED STATES PATENTS

| | | | |
|---|---|---|---|
| 2,676,118 | 4/1954 | Thomas | 106—193I |
| 2,727,837 | 12/1955 | Gregory | 117—157 |
| 3,093,603 | 6/1963 | Gilchrist | 260—17 |
| 3,215,549 | 11/1965 | Ericson | 106—193I |

MORRIS LIEBMAN, Primary Examiner

T. MORRIS, Assistant Examiner

U.S. Cl. X.R.

106—193; 117—157